US008966883B2

(12) United States Patent
Gouriet et al.

(10) Patent No.: US 8,966,883 B2
(45) Date of Patent: Mar. 3, 2015

(54) PROCESS FOR STARTING AN SCR SYSTEM (75) Inventors: Jean-Baptiste Gouriet, Evere (BE);
Jean-Claude Habumuremyi, Haaltert (BE); Stephane Leonard, Brussels (BE); Volodia Naydenov, Louvain-la-neuve (BE)

(73) Assignee: Inergy Automotive Systems Research (Société), Brussels (BE)

( * ) Notice: Subject to any disclaimer, the term of this patent is extended or adjusted under 35 U.S.C. 154(b) by 1014 days.

(21) Appl. No.: 12/995,559

(22) PCT Filed: Jun. 2, 2009

(86) PCT No.: PCT/EP2009/056754
§ 371 (c)(1),
(2), (4) Date: Dec. 1, 2010

(87) PCT Pub. No.: WO2009/147146
PCT Pub. Date: Dec. 10, 2009

(65) Prior Publication Data
US 2011/0079000 A1 Apr. 7, 2011

(30) Foreign Application Priority Data

Jun. 3, 2008 (FR) ...................................... 08 53636
Apr. 24, 2009 (FR) ...................................... 09 52688

(51) Int. Cl.
*F01N 3/00* (2006.01)
*F01N 3/20* (2006.01)

(52) U.S. Cl.
CPC .............. *F01N 3/208* (2013.01); *F01N 2610/02* (2013.01); *F01N 2610/1433* (2013.01);
(Continued)

(58) Field of Classification Search
CPC ............. F01N 2610/1486; F04B 53/08; F04B 2203/0205; F04N 53/08
USPC .......................................... 60/286, 287, 300
See application file for complete search history.

(56) References Cited

U.S. PATENT DOCUMENTS 3,509,438 A * 4/1970 Kachuk .................... 318/400.41
6,326,748 B1 * 12/2001 Moroto et al. ............. 318/400.3
(Continued)

FOREIGN PATENT DOCUMENTS

DE 102004046266 A1 4/2006
EP 1676628 A1 7/2006
(Continued)

OTHER PUBLICATIONS

Machine English Translation of JP2000014114 to Kato, Kazunari.*
Machine English Translation of JP2006-46151 Miyamoto.*
DIN 70070—(Aug. 2003-Aug. 2005) standard : "Diesel engines NOx-Reduction agent from 32 Quality requirements"; 2005, Beuth Publishing House GmbH, Berlin; 26 pgs (including Machine Translation in English).

*Primary Examiner* — Kenneth Bomberg
*Assistant Examiner* — Anthony Ayala Delgado
(74) *Attorney, Agent, or Firm* — Oblon, McClelland, Maier & Neustadt, L.L.P.

(57) ABSTRACT

Process for starting an SCR system intended for transporting urea from a tank to the exhaust gases of an engine using a feed line, this system comprising a rotary pump controlled by a controller and driven by a brushless direct current (BLDC) motor that comprises a rotor equipped with at least one permanent magnet and with a stator comprising at least 3 electromagnetic coils in which the direct current can flow according to a given sequence to make the rotor rotate, according to which, before starting the pump, a temperature is measured using a sensor and if this temperature is below a setpoint temperature, before making the rotor rotate, the current is passed through at least one of the coils in a way such that it preheats the pump without making the rotor rotate.

17 Claims, 4 Drawing Sheets (52) U.S. Cl.
CPC ... *F01N2610/144* (2013.01); *F01N 2610/1493* (2013.01); *F01N 2900/1811* (2013.01); *F01N 2900/1822* (2013.01); *Y02T 10/24* (2013.01)
USPC .................................. 60/286; 60/287; 60/300

(56) References Cited

U.S. PATENT DOCUMENTS

| | | | |
|---|---|---|---|
| 2002/0187051 A1* | 12/2002 | Maier et al. | 417/203 |
| 2003/0049134 A1* | 3/2003 | Leighton et al. | 417/40 |
| 2007/0044457 A1 | 3/2007 | Upadhyay et al. | |
| 2007/0048204 A1 | 3/2007 | Mital | |
| 2008/0092531 A1* | 4/2008 | Suzuki et al. | 60/301 |
| 2008/0138221 A1 | 6/2008 | Jochumsen et al. | |
| 2009/0212076 A1 | 8/2009 | Fertig | |
| 2010/0043409 A1 | 2/2010 | Naydenov et al. | |
| 2010/0172763 A1 | 7/2010 | Habumuremyi | |
| 2010/0220984 A1 | 9/2010 | Potier et al. | |

FOREIGN PATENT DOCUMENTS

| | | | |
|---|---|---|---|
| FR | 2911643 A1 | | 7/2008 |
| FR | 2916188 A1 | | 11/2008 |
| FR | 2917791 A1 | | 12/2008 |
| FR | 2918718 A1 | | 1/2009 |
| GB | 2273617 A | | 6/1994 |
| JP | 2000014114 A | * | 1/2000 |
| JP | 2006046151 A | * | 2/2006 |
| JP | 20060046151 A | | 2/2006 |
| WO | WO 0079108 A1 | | 12/2000 |
| WO | WO 0225074 A1 | | 3/2002 |
| WO | WO 2006064028 A1 | * | 6/2006 |
| WO | WO 20070141312 A1 | | 12/2007 |

* cited by examiner

PROCESS FOR STARTING AN SCR SYSTEM

CROSS-REFERENCE TO RELATED APPLICATIONS

The present patent application is a U.S. national stage application under 35 U.S.C. §371 of International Application No. PCT/EP2009/056754 filed Jun. 2, 2009 which claims the benefit of the French patent application No. 08.53636 filed on Jun. 3, 2008 and of the French patent application No. 09.52688 filed on Apr. 24, 2009, the whole content of these applications being incorporated herein by reference for all purposes.

TECHNICAL FIELD

The present application relates to a process for starting an SCR system intended to work in freezing conditions. It relates, in particular, to preheating pumps intended for aqueous urea solutions.

BACKGROUND

Legislation on vehicle and heavy goods vehicle emissions stipulates, amongst other things, a reduction in the release of nitrogen oxides $NO_x$ into the atmosphere. One known way to achieve this objective is to use the SCR (Selective Catalytic Reduction) process which enables the reduction of nitrogen oxides by injection of a reducing agent, generally ammonia, into the exhaust line. This ammonia may derive from the pyrolytic decomposition of an ammonia precursor solution, whose concentration may be the eutectic concentration. Such an ammonia precursor is generally a urea solution.

With the SCR process, the high levels of $NO_x$ produced in the engine during combustion at optimized efficiency are treated in a catalyst on exiting the engine. This treatment requires the use of the reducing agent at a precise concentration and of extreme quality. The solution is thus accurately metered and injected into the exhaust gas stream where it is hydrolysed before converting the nitrogen oxide ($NO_x$) to nitrogen ($N_2$) and water ($H_2O$).

In order to do this, it is necessary to equip the vehicles with a tank containing an additive solution (generally an aqueous urea solution) and also a device for conveying and metering the desired amount of additive and injecting it into the exhaust line. Given that the aqueous urea solution generally used for this purpose (eutectic 32.5 wt % urea solution) freezes at −11° C., it is necessary to provide a heating device to liquefy the solution in order to be able to inject it into the exhaust line in the event of starting in freezing conditions. This device should ideally cover at least one part of the storage tank and also the line going from this tank to the injector, and preferably also the accessories encountered in this line (filter, pump, etc.).

In one preferred variant, the subject of Application FR 0755118 (published as FR 2916188) in the name of the Applicant, these accessories are integrated into a base plate submerged in the tank and which is heated using a flexible heater, that is to say one or more resistive track(s) inserted between two flexible films or affixed to a flexible film. Although very effective and capable of matching all the shapes of base plates and of accessories, this type of device has an additional cost and furthermore it does not make it possible to easily heat the inside of large parts such as the pump for example.

However, one type of pump that is very efficient, especially for urea systems, is composed of a rotary pump driven by a brushless direct current (BLDC) motor. In such a motor, the rotor is rotated by the sequential switching (according to a defined timing) of electromagnetic coils placed in the stator. Although the conductive wires at the base of these coils (windings) generally have a relatively low resistance (in order to prevent losses via the Joule effect and excessive heating of the motor), they emit however a not inconsiderable heat, which is of course only available once the pump is started.

SUMMARY

The present invention is based on the idea of taking advantage of this release of heat via the Joule effect, but without causing the pump to rotate, in order to preheat the pump (before it is started up) in the event of freezing for example.

For this purpose, the present application relates to a process for starting an SCR system intended for transporting urea from a tank to the exhaust gases of an engine using a feed line, this system comprising a rotary pump controlled by a controller and driven by a brushless direct current (BLDC) motor that comprises a rotor equipped with at least one permanent magnet and with a stator comprising at least 3 electromagnetic coils in which the direct current can flow according to a given sequence to make the rotor rotate, according to which, before starting the pump, a temperature is measured using a sensor and if this temperature is below a setpoint temperature, before making the rotor rotate, the current is passed through at least one of the coils in a way such that it preheats the pump without making the rotor rotate.

BRIEF DESCRIPTION OF THE DRAWINGS

For a detailed description, reference will now be made to the accompanying drawings in which.

DETAILED DESCRIPTION

The pump to which the invention applies is a rotary pump driven by a BLDC motor and the operation of which is controlled by a controller. This motor may be an internal or external rotor motor. Preferably, it is an internal rotor motor.

The stator of this motor comprises at least 3 coils in order to have at least 3 phases which may be assembled in star or triangle configuration. This stator therefore comprises, in general, a multiple of 3 coils, generally 3, 6 or 9. Good results have been obtained with a motor having an internal rotor and a stator comprising 9 coils positioned uniformly around the rotor, and being connected so as to form 3 phases (i.e. each phase (A, B or C) comprising 3 coils, and said coils being uniformly positioned around the rotor in the order A, B, C, A, B, C, A, B, C).

The pump to which the process according to the invention applies is preferably designed in order to be able to operate in two opposite rotational directions, one generally corresponding to supplying a feed line with liquid and the other generally corresponding to a purge of the feed line (and of the accessories found therein). In practice, this may be easily achieved by reversing the activation sequence of the coils (phases).

Preferably, the rotary pump is of the gear pump type. These pumps actually have the advantage of providing identical pumping efficiency in both directions of rotation.

Also preferably, the rotor of the pump is an internal rotor provided with at least one recess through which the sucked-up liquid is forced. This variant is the subject of Application FR 0756387 (published as FR 2918718) in the name of the Applicant, the content of which is incorporated by reference in the present application. In this variant, the residues of liquids that might be contained in the pump after the purge are optimally heated.

The controller of the pump is a control module (generally comprising a PID (proportional—integral—derivative) regulator and a motor rotational speed controller) and an electric power supply unit which preferably supplies the motor with the power required to rotate it at the desired speed and which enables its direction of rotation to be reversed, where necessary.

Most particularly preferably, an ECM (Electronic Control Module) sends to the pump controller, a CAN (Controller Area Network) message or a PWM (Pulse Width Modulation) control signal having a duty cycle that varies as a function of the desired operating conditions for the pump and the controller then acts on the motor to apply said operating conditions to the pump. Such a system is the subject of Application FR 0700358 (published as FR 2911643) in the name of the Applicant, the subject of which is incorporated by reference in the present application.

Within the context of this variant of the invention, the expression "operating conditions" is understood to mean information relating to the operating pressure of the pump (which is zero when this pump is at rest, in preheating mode or not) and also at least one other piece of information such as the stopping/blocking thereof, its rotational direction and the fact that it must operate in preheating mode. They are preferably all the operating conditions of the pump, namely: stopping, forward drive, reverse drive, operating pressure (at the pump outlet), preheating, etc. so that the pump operation is entirely governed by a single signal. In other words: the controller receives coded instructions (in the form of CAN message or in the form of a PWM signal of variable duty cycle) telling it if it must stop the pump or rotate it forwards, in reverse and at what pressure, or if it must preheat it, which it does by acting on the motor, i.e. generally by in turn sending it a voltage signal which may be of PWM type.

The pump controller interprets this CAN message or PWM-type signal and, depending on the CAN information or on the duty cycle, stops the pump or switches the phases (the coils) in order to regulate the pressure requested or in order to purge the system or in order to heat the pump.

In a preferred embodiment, a security is provided in order to prevent the pump from overheating. It is based on the fact that the current decreases with the temperature (since the resistance of the coils increases, while the power supply (voltage) remains constant). In this embodiment, the controller monitors the current and when said current reaches a given minimum value, the power is switched off. In practice, with the 9 coils motor described above, and with a power supply of 0.5 V, this could happen when the current (initially equal to 7 A) reaches 6 A.

The pump to which the process according to the invention applies is intended for pumping (transporting) a liquid in freezing conditions, that is to say when the temperature reaches a low temperature threshold and when the liquid is capable of freezing or solidifying. These may, for example, be aqueous solutions. One liquid to which the present invention applies particularly well is urea.

The term "urea" is understood to mean any, generally aqueous, solution containing urea. The invention gives good results with eutectic water/urea solutions for which there is a quality standard: for example, according to the standard DIN 70070, in the case of the AdBlue® solution (commercial solution of urea), the urea content is between 31.8% and 33.2% (by weight) (i.e. 32.5+/−0.7 wt %) hence an available amount of ammonia between 18.0% and 18.8%. The invention may also be applied to the urea/ammonium formate mixtures, also in aqueous solution, sold under the trade name Denoxium™ and of which one of the compositions (Denoxium-30) contains an equivalent amount of ammonia to that of the AdBlue® solution. The latter have the advantage of only freezing from −30° C. onwards (as opposed to −11° C.), but have the disadvantages of corrosion problems linked to the possible release of formic acid and a less available market (whereas urea is widely used and readily available even in fields such as agriculture). The present invention is particularly advantageous in the context of eutectic water/urea solutions.

The urea is generally contained in a tank onboard a motor vehicle and this tank is advantageously equipped with a base plate or mounting plate (that is to say a support having substantially the shape of a plate) onto which at least one active accessory of the urea storage system and/or injection system is attached. This base plate generally has a perimeter, closed up on itself, of any shape. Usually, its perimeter has a circular shape.

In a most particularly preferred manner, this base plate is a submerged mounting plate, i.e. that seals an opening in the lower wall of the tank, and it integrates at least the pump. The expression "lower wall" is in fact understood to mean the lower half of the tank (whether or not it is moulded in one piece or from two parison sheets or cut-outs).

Within the process according to the invention, in the preheating mode, current is passed through at least one coil (preferably, through all of them) but in a way such that the rotor doesn't rotate. On the contrary, during the operation of the pump, current passes through the coils according to a sequence such that the electromagnetic force or forces generated have a tangential component so as to create a permanent rotational torque. In the case of a motor having 3 coils, it is sufficient, for example, to activate each coil in turn, in a given direction (clockwise or anti-clockwise), while deactivating the other 2, to generate such a torque. In the case of a pump with 9 coils and 3 phases as described above, each phase can be activated in turn for instance.

In order not to generate a permanent torque while getting a heating effect, it is possible, during each heating cycle, to activate the coils (phases) according to a given sequence (time scheme) not generating any torque, or randomly. An example of a given activating sequence generating no torque is given in appended FIGS. 1 to 3, which will be commented later on.

Alternatively, during each heating cycle, some of the coils (phases) may be powered constantly, while some others are not. This embodiment is preferred because in the former one, at each switch (change of coils which are activated), a punctual torque is generated, which can lead to mechanical tensions if the pump is actually blocked with frozen liquid. In an even more preferred embodiment, the coils which are permanently powered during each heating cycle are memorized by the controller and in the next heating cycle, at least some of them are put at rest while others (at rest in the first heating cycle) are activated. This embodiment has the advantage of being Mere-simple simpler and of not ageing too much specific coils i.e. of spreading the wear owed to the heating process on all the coils. For example, in the above described pump with 9 coils and 3 phases, the following heating cycles may be repeated (in terms of phases activated continuously during a given cycle): A & B, A & C, B & C. Alternatively, the controller may randomly choose 2 phases to power in each heating cycle.

In a preferred embodiment of the invention, the generation of a punctual torque is avoided also when starting a heating cycle (which happens when starting in freezing conditions and in the case of a pump able to turn in reverse (purge) mode, after the pump has turned in reverse mode the last time the system was running). In order to reach this goal, the stator must be in a magnetic equilibrium position with the rotor before switching of the pump, said equilibrium position corresponding to a zero torque on the rotor when the coils (phases) required for the next heating cycle (programmed in the controller) are activated.

This may for instance be done by merely letting the rotor slow down and stop in a given position after a system run (when the power on the pump is switch off), then applying briefly the activation scheme for the next heating cycle so that the magnetic equilibrium position corresponding thereto is reached before definitively switching off the power of the system.

Alternatively, the controller may act on the rotor at the end of a system run in order to artificially stop (brake) it (for instance by decreasing its duty cycle gradually so that a zero speed is given as last instruction), memorize the corresponding coils (phases) that were lastly activated in order to activate the same ones continuously in the next heating cycle.

The present invention relates, in particular, to a process according to which:
1. the temperature (T1) of the urea held in the tank is determined and compared to the setpoint temperature (T0);
2. if the temperature (T1) is greater than the setpoint temperature (T0), the pump is actuated;
3. if the temperature (T1) is less than or equal to the setpoint temperature (T0), the tank and the pump are heated, without making the pump rotate, for a duration t1; then
4. the pump is actuated for a duration t2 during which the pump outlet pressure is measured;
5. if this pressure is stable and in an acceptable margin of the setpoint pressure, the pump is kept going;
6. if this pressure is not stable and/or is not in the acceptable margin of the setpoint pressure, the pump is stopped and the tank and the pump are heated for a duration t3, at the end of which steps 4 to 6 are repeated.

One such process, but only with heating of the tank (and not explicitly with heating of the pump, although the latter is heated via the tank heater) is the subject of Application FR 0755875 (published as FR 2917791) in the name of the Applicant, the content of which is, for this purpose, incorporated by reference in the present application.

According to one particularly advantageous variant of the process according to the invention, the heating of the pump is not activated all the time the one of the tank is activated since the pump in fact heats up faster than the minimum defrosting time of the tank, so that the danger exists that the pump would overheat. A minimum defrosting time is generally imposed by motor vehicle manufacturers, and is sometimes referred to as the EPA time since the standard for determining this time is imposed in the USA by the EPA (or Environmental Protection Agency), while the Applicant has found that the time required to thaw the pump (with a given design and power supply) is preferably calculated as a function of the temperature (ambient temperature or the temperature in the tank) and of the level of liquid in the tank (which may be determined by a gauge but which is preferably calculated by the ECM).

Therefore, according to one advantageous variant of the process according to the invention, the preheating time (=Tpc) of the pump via the coils as described above is determined as a function of the temperature and of the volume of liquid in the tank. And according to one particularly advantageous variant, the tank is heated starting from a time t0 for a duration t1 and the heating of the pump via its coils is started after a period t1-Tpc, the heating of the tank and that of the pump being stopped at the same time, at the end of a time t1 therefore, which is generally a fixed duration imposed by the manufacturer (and which is for example the EPA time as described above) whereas Tpc is calculated as explained below. In other words: the tank is heated starting from a time t0 for a duration t1 and the pump is heated after a period t1-Tpc for a duration Tpc, where t1 is a fixed duration but where Tpc is calculated as a function of the temperature and of the volume of urea present in the tank.

As soon as the heating (of the pump and of the tank) is stopped, i.e. after the period t1, the pump is preferably started according to a scheme similar to steps 4 to 6 described above, namely:
1. the pump is actuated for a time t2 during which the pump outlet pressure is measured;
2. if this pressure is stable and in an acceptable margin of the setpoint pressure, the pump is kept going;
3. if this pressure is not stable and/or is not in the acceptable margin of the setpoint pressure, the pump is stopped and the tank and the pump are heated for a duration t3, at the end of which steps 1 to 3 are repeated.

According to another, even more preferred embodiment of the invention (allowing to better benefit of the heat conduction phenomenon), either the pump is heated at the beginning of the tank heating, or it is heated sporadically in order to reach the total heating time required all over the heating period of the tank.

Alternatively to the embodiments described above, the power supply of the pump (i.e. the current that is passed through the coils of the stator) during preheating can be adapted in order to have the thaw time of the pump match that of the tank.

It should finally be noted that on average the reference voltage is estimated as 13.5 V (volts) for the systems integrated into a vehicle, whereas in practice this voltage may fluctuate. Therefore, according to one advantageous variant of the invention (that can be combined with those described above), the heating time (in particular of the pump) is adapted as a function of the voltage measured by the ECU, notably: if this voltage is below 13.5 V, the heating time will be longer and if it is above 13.5 V, the heating time will be shorter.

In one advantageous variant of the process according to the invention, the feed line is purged after each use of the pump (just before it is stopped) in order to reduce the starting time of the system and avoid prematurely damaging the lines and the accessories (as the urea solutions expand in freezing conditions). The purge may be carried out, for example, by reversing the rotational direction of the pump just for the time necessary to convey the liquid contained in the feed line and the accessories back to the tank.

The present invention also relates to an SCR system for a motor vehicle (car, lorry, etc.) comprising a liquid pump that has a BLDC-type drive motor that comprises a rotor equipped with at least one permanent magnet and a stator comprising at least 3 electromagnetic coils, this motor being controlled by a system that makes it possible to make current flow into at least one of the coils without causing the rotor to rotate.

According to one preferred variant, the SCR system comprises a tank equipped with a heater and a time delay device capable of starting the heating of the tank and that of the pump at a later time.

It should be noted that the preferred variants described above in the context of the processes apply equally to the pump and to the SCR system according to the invention.

The present invention is illustrated in a non-limiting manner by the appended FIGS. 1 to 4.

Figure 1:
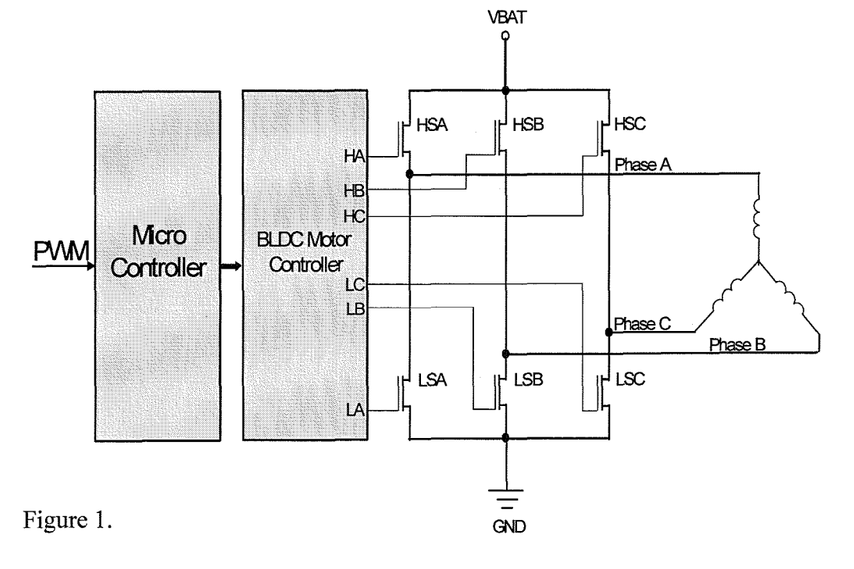
FIG. 1 illustrates a switching scheme for a BLDC motor having three coils that are respectively connected in star configuration.
Figure 2:
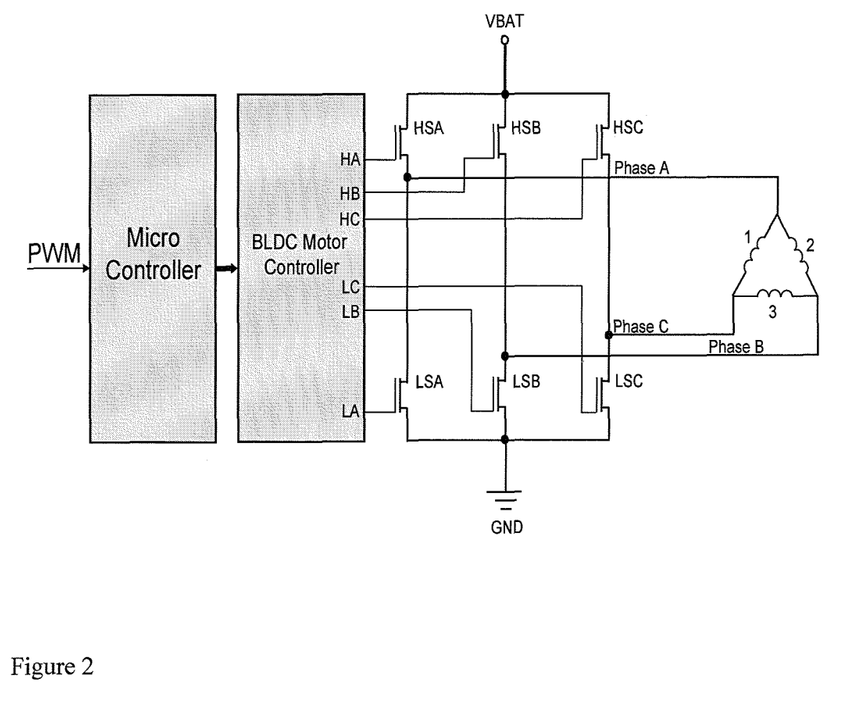
FIG. 2 illustrates a switching scheme for a BLDC motor having three coils that are respectively connected in triangle configuration.
Figure 3:
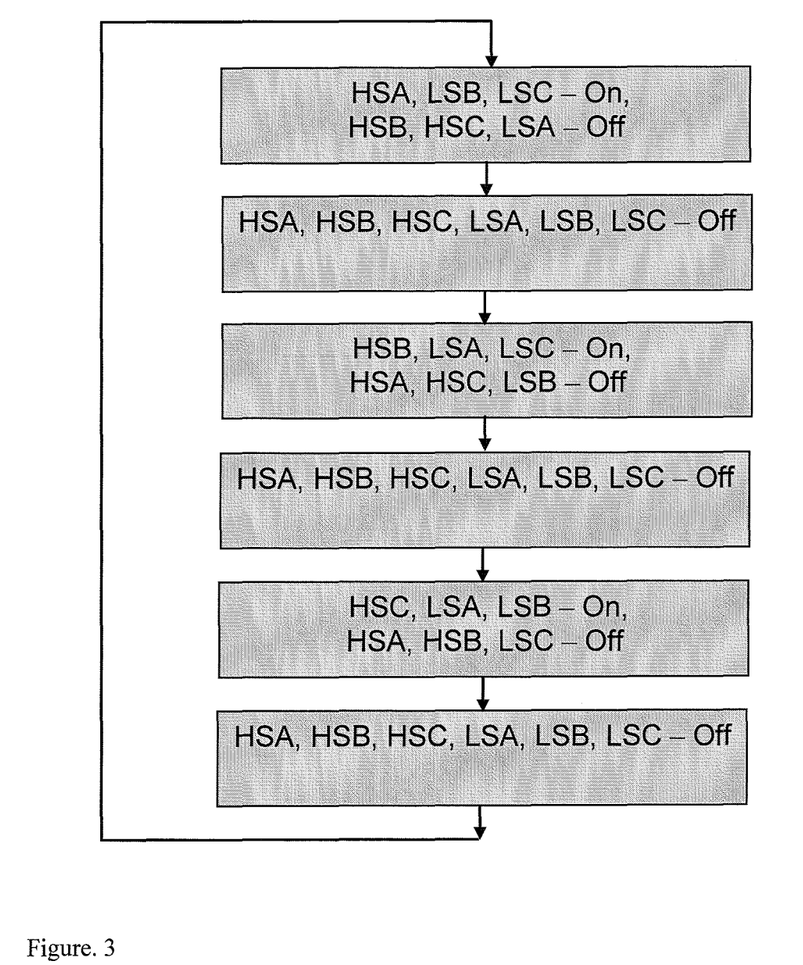
FIG. 3 illustrates a logic diagram of switching sequences enabling the preheating of the motor from the FIGS. 1 and 2.
Figure 4:
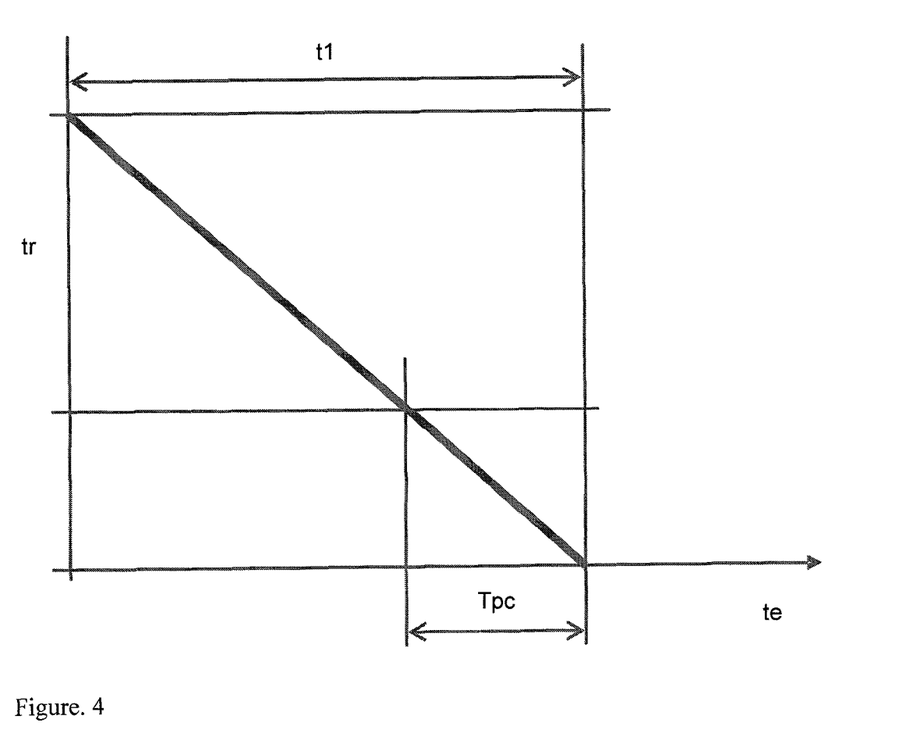
FIG. 4 illustrates the heating time of the tank and of the pump according to one preferred variant of the invention.

FIGS. 1 and 2 illustrate a switching scheme for a BLDC motor having 3 coils that are respectively connected in star configuration (FIG. 1) and in triangle configuration (FIG. 2). FIG. 3 illustrates a logic diagram of switching sequences enabling the preheating of the motor from these FIGS. 1 and 2. Lastly, FIG. 4 illustrates the heating time of the tank and of the pump according to one preferred variant of the invention.

The BLDC motor from these figures is intended for a pump controlled by a controller that comprises a control module ("Micro Controller" in the figures) and a power supply for the BLDC motor ("BLDC Motor Controller" in the figures). This controller receives a CAN message or PWM signal from an electronic control module (ECM) that is not illustrated.

The BLDC motor is powered by a voltage source (VBAT) and is earthed (GND).

If the BLDC motor is connected in star configuration (FIG. 1): firstly, the switches HSA, LSB and LSC are activated. In this case, the current of phase A is the sum of the currents of phases B and C, therefore the coil of phase A will heat up more than the coils of phases B and C. This is why, secondly, in order to equalize the temperature field, the phases are switched by activating the switches HSB, LSA and LSC. In this case it is the current of the phase B which is the sum of the currents of the phases A and C. The third step of the sequence is to activate the switches HSC, LSA and LSB and to obtain a current of the phase C which is the sum of the phases A and B.

If the BLDC motor is connected in triangle configuration (FIG. 2): firstly, the switches HSA, LSB and LSC are activated. In this case, the current of phase A is the sum of the currents of the coils 1 and 2 which are equal, therefore the coils 1 and 2 heat up in the same way, but there is no current in coil 3 and it does not heat up. Secondly, the phases are switched by activating the switches HSB, LSA and LSC. In this case, it is the current of phase B which is the sum of the currents of the coils 2 and 3, and there is no current in coil 1, which does not heat up. The third step of the sequence is to activate the switches HSC, LSA and LSB and to obtain a current of the phase C which is the sum of the currents of the coils 1 and 3; there is then no current in coil 2, which does not heat up.

A PWM type regulation is applied to the control of the switches in order to vary the current in the phases as explained above (and visualized in the diagram from FIG. 3).

By way of example, the current in a BLDC motor that is connected in a triangle configuration is around 6 A when applying a voltage of around 2.5 V, which gives a heating power of around 15 W.

FIG. 4 illustrates a preferred strategy according to the invention where the pump is heated at a later time relative to the tank, the latter being heated for a predetermined duration t1 (e.g., the EPA time as described above) whereas the pump is heated for a duration Tpc as described previously. FIG. 4 in fact illustrates the heating time remaining (tr) on a timer started at the same time as the heating of the pump, as a function of the time elapsed (te) since starting the timer. As can be seen in this figure, the heating of the pump is only started after a period t1-Tpc.

The invention claimed is:

1. A process for starting a selective catalytic reduction (SCR) system for transporting urea from a tank to exhaust gases of an engine using a feed line, the system including a rotary pump controlled by a pump controller and driven by a brushless direct current (BLDC) motor that is able to operate in two opposite rotational directions and includes a rotor equipped with at least one permanent magnet and a stator including at least 3 electromagnetic coils in which the direct current can flow according to a given sequence to make the rotor rotate, the process comprising: before starting the pump, measuring a temperature using a sensor; before making the rotor rotate, passing a current through at least one of the coils to preheat the pump without making the rotor rotate when the temperature is below a setpoint temperature; and
   sending to the pump controller a PWM (Pulse Width Modulation) control signal giving orders of the desired operating conditions for the pump, these conditions integrating a piece of information relating to the rotational direction of the pump, a piece of information relating to the operating pressure of the pump, and also at least one other piece of information relating to the stopping/blocking of the pump and the fact that it must operate in preheating mode.

2. The process according to claim 1, further comprising:
   operating the pump in two opposite rotational directions, one corresponding to supplying a feed line with liquid and the other corresponding to a purge of the feed line and of any accessories found therein.

3. The process according to claim 2, wherein the pump is a gear pump.

4. The process according to claim 1, further comprising:
   sending from an ECM (Electronic Control Module) to the pump controller, the PWM control signal, having a duty cycle that varies as a function of the desired operating conditions for the pump.

5. The process according to claim 1, further comprising:
   monitoring the current by the pump controller, and
   switching the power off when the current reaches a given minimum value.

6. The process according to claim 1, further comprising:
   during the preheating of the pump, powering constantly some of the coils and not powering some others;
   memorizing by the controller the coils which are permanently powered during each preheating cycle; and
   in the next preheating cycle, not powering at least some of the coils while powering others (not powered in the former preheating cycle).

7. The process according to claim 6, further comprising:
   positioning the stator in a magnetic equilibrium position with the rotor before switching of the pump, the equilibrium position corresponding to a zero torque on the rotor when the coils required for the next heating cycle are activated.

8. The process according to claim 1, further comprising:
   determining a preheating time of the pump as a function of the temperature and of a volume of liquid in the tank.

9. The process according to claim 1, further comprising:
   adapting the current that is passed through the coils of the stator during preheating in order to have the thaw time of the pump match that of the tank.

10. A selective catalytic reduction (SCR) system for transporting urea from a tank to exhaust gases of an engine of a motor vehicle, the system comprising:
   a feed line:
   a liquid pump having a BLDC-type drive motor that is able to operate in two opposite rotational directions and includes a rotor equipped with at least one permanent magnet and a stator comprising at least 3 electromagnetic coils, in which the direct current can flow according to a given sequence to make the rotor rotate;

a sensor for measuring a temperature; and a pump controller configured to control the BLDC-type drive motor, before making the rotor rotate, by providing a current flow into at least one of the coils to preheat the pump without causing the rotor to rotate, when the temperature is below a setpoint temperature and wherein the pump controller receives a PWM (pulse width modulation) control signal giving orders of the desired operating conditions for the pump, these conditions integrating a piece of information relating to the rotational direction of the pump, a piece of information relating to the operating pressure of the pump, and also at least one other piece of information relating to the stopping/blocking of the pump and the fact that it must operate in preheating mode.

11. The process according to claim 1, further comprising:
before making the rotor rotate, passing the current through the at least one of the coils to preheat the pump without making the rotor rotate so that a current passed through one of the coils is greater than a current passed through another one coil of the coils when the temperature is below the setpoint temperature.

12. The process according to claim 1, further comprising:
before making the rotor rotate, passing the current through the at least one of the coils to preheat the pump without making the rotor rotate so that a current is passed through one of the coils while no current is passed through another one coil of the coils when the temperature is below the setpoint temperature.

13. The process according to claim 1, further comprising:
before making the rotor rotate, passing the current through the at least one of the coils to preheat the pump without making the rotor rotate so that currents are passed through two of the coils while no current is passed through another one coil of the coils when the temperature is below the setpoint temperature.

14. The process according to claim 13, wherein the currents passed through the two of the coils have the same amplitude.

15. The process according to claim 1, further comprising:
before making the rotor rotate, passing currents through a first coil or the first coil and a second coil of the coils to preheat the pump without making the rotor rotate, while no current is passed through a third coil of the coils when the temperature is below the setpoint temperature, and
alternating which of the first, second, and third coils currents are passed through in a next preheating of the pump.

16. The process according to claim 1, wherein the sending to the pump controller a PWM control signal is by a micro-controller with a predefined program.

17. The SCR system according to claim 10, further comprising a micro-controller including a predefined program that sends the PWM control signal to the pump controller.

* * * * *

UNITED STATES PATENT AND TRADEMARK OFFICE
CERTIFICATE OF CORRECTION

PATENT NO.        : 8,966,883 B2
APPLICATION NO.   : 12/995559
DATED             : March 3, 2015
INVENTOR(S)       : Jean-Baptiste Gouriet et al.

It is certified that error appears in the above-identified patent and that said Letters Patent is hereby corrected as shown below:

On the title page, Item (73), the Assignee's information is incorrect.
Item (73) should read:

-- Assignee: Inergy Automotive Systems Research (Société Anonyme), Brussels (BE) --

Signed and Sealed this
Fourth Day of August, 2015

Michelle K. Lee
*Director of the United States Patent and Trademark Office*